US008807494B2

(12) United States Patent
Magnani et al.

(10) Patent No.: US 8,807,494 B2
(45) Date of Patent: Aug. 19, 2014

(54) ADJUSTABLE SUPPORT FRAME WITH MANIFOLD

(75) Inventors: Thomas J. Magnani, Troy, OH (US); George Lindley, Houston, TX (US); Leroy J. Wall, West Alexandria, OH (US); John O. Lee, Eaton, OH (US)

(73) Assignee: Rexarc International, Inc., West Alexandria, OH (US)

( * ) Notice: Subject to any disclaimer, the term of this patent is extended or adjusted under 35 U.S.C. 154(b) by 245 days.

(21) Appl. No.: 12/909,133

(22) Filed: Oct. 21, 2010

(65) Prior Publication Data

US 2012/0097830 A1 Apr. 26, 2012

(51) Int. Cl.
*F16M 13/00* (2006.01)
*F16M 11/00* (2006.01)

(52) U.S. Cl.
USPC ............................ 248/125.8; 248/126; 269/79

(58) Field of Classification Search
USPC .......... 248/200.1, 218.4, 219.1, 219.3, 316.1, 248/188.91, 230.1, 121, 122.1, 125.1, 248/125.7, 125.8, 161, 222.14, 229.22, 248/346.5, 346.06, 346.07, 440; 280/79.3, 280/79.6, 79.7, 47.35; 602/33, 34, 35; 211/85.13, 85.18; 269/17, 60, 61, 71, 269/20, 55, 74, 79, 304, 319; 5/81.1 R, 5/503.1
See application file for complete search history.

(56) References Cited

U.S. PATENT DOCUMENTS 569,289 A * 10/1896 Lynch ............................ 211/17
2,518,569 A * 8/1950 Pierson ........................... 48/192
2,550,983 A * 5/1951 Ettinger .......................... 602/33
3,218,056 A * 11/1965 Kaplan et al. .................. 269/17
3,427,066 A * 2/1969 Kugler ......................... 294/67.3
3,643,813 A 2/1972 Noonan
4,183,511 A * 1/1980 Marek ............................ 269/17
4,239,196 A * 12/1980 Hanger .......................... 269/17
4,257,410 A * 3/1981 Flewelling ...................... 602/33
4,266,765 A * 5/1981 Sandoval et al. ............... 482/68
4,295,431 A 10/1981 Stavlo
4,298,151 A * 11/1981 O'Connor ..................... 224/329
4,481,972 A 11/1984 Stavlo
4,542,774 A 9/1985 Stavlo
4,564,109 A 1/1986 Stavlo
4,804,162 A * 2/1989 Rice .............................. 248/671
4,830,066 A 5/1989 Dresen et al.
4,890,605 A * 1/1990 Rosendale ...................... 602/33

(Continued)

OTHER PUBLICATIONS

Gas Container Services—High Pressure Storage, http:www.gcs.eu.com/HPS.html (retrieved from the internet on Aug. 23, 2012).

(Continued)

*Primary Examiner* — Tan Le
(74) *Attorney, Agent, or Firm* — Thompson Hine L.L.P.

(57) ABSTRACT

A support frame attachable to a pressurized gas cylinder pallet is disclosed. The support frame includes an adjustable first support member having a first brace and a second brace and a second support member having a third brace that extends from the first support member. The first support member is adjustable to move the first and second brace into engagement with the pallet and the third brace is slidable along the second support member to also move the third brace into engagement with the pallet. The three points of contact stabilize the support frame on the pallet such that a manifold can be connected to the support frame for connection to the cylinders on the pallet. Also disclosed is a kit including the support frame and the manifold.

26 Claims, 8 Drawing Sheets

(56) References Cited

U.S. PATENT DOCUMENTS

| | | | | | |
|---|---|---|---|---|---|
| 5,000,407 | A * | 3/1991 | Juji et al. | 248/125.8 |
| 5,176,265 | A | 1/1993 | Bennett | |
| 5,344,169 | A * | 9/1994 | Pryor et al. | 280/79.3 |
| 6,079,678 | A * | 6/2000 | Schott et al. | 248/229.15 |
| 6,231,016 | B1 * | 5/2001 | Slone | 248/200.1 |
| 6,494,327 | B2 * | 12/2002 | Huang | 211/17 |
| 8,047,484 | B2 * | 11/2011 | Newkirk et al. | 248/219.1 |
| 2009/0107089 | A1 | 4/2009 | Chung | |

OTHER PUBLICATIONS

CEFRANK Manifold Cylinder Packs/Bundles (MCPs)—Safe and cost effective, http://www.cefrank.com.au/packs.html (Jul. 19, 2008).

Chen, Andrew W. "A Study of Fluid Flow Manifolds by Numerical Simulation and Experimentation," published by ProQuest Information and Learning Company, USA, 2008, p. 7.

* cited by examiner

ADJUSTABLE SUPPORT FRAME WITH MANIFOLD

TECHNICAL FIELD

The present application relates to an adjustable support frame that fits various gas cylinder pallets. The adjustable support frame may include a manifold.

BACKGROUND

Gas cylinders such as pressurized gas cylinders are often purchased as individual cylinders or in packs of four or more cylinders. The packs may include as many as 6, 8, 12, 16, or even 20 cylinders. To handle and ship these cylinders as a single unit they are typically packaged together on a cylinder pallet, also sometimes referred to a cylinder pack, bundle, or cradle.

Some pallets include a permanently attached manifold system connected to the cylinders, creating a "manifolded cylinder pallet." A single gas cylinder is usually qualified for a ten-year period, but once installed in a manifolded cylinder cradle, pack, or pallet, from which they are not typically removed, the cylinders are required to be requalified every five years. Currently, the cradle, pack, or pallet must be disassembled every five years to requalify all the cylinders contained therein. If the pack of cylinders contains carbon dioxide or nitrous oxide, or a liquid fuel gas such as propylene, propane, or acetylene the cylinder must be removed from the pack to be re-filled, which will require disassembling the cradle, pack, or pallet to fill all of the cylinders.

SUMMARY

Disclosed herein are a plurality of embodiments of a universal support frame for a manifold such as a gas distribution manifold that may be moved from pallet to pallet regardless of the pallet's construction. Accordingly, the universal support frame is demountably attachable to the pallet. The manifold may be demountably and/or rotatably coupled to the support frame, which eliminates the need for periodic system requalification and makes cylinder replacement and/or refill easier.

One aspect of the invention is a support frame that is attachable to an article, for example, a pallet that can hold gas cylinders such as pressurized gas cylinders. The support frame includes a first support member that has a first brace and a second brace and is adjustable to move the first and second brace into engagement with the article. The support frame also includes a second support member extending from the first support member. The second support member has a third brace thereon that is slidable along the second support member to move the third brace into engagement with the article. Accordingly, the support frame provide three points of contact with the article via the braces to stabilize the support frame so that it may support another member such as an arm having a manifold connected thereto. At least one of the first, second, and third braces is preferably generally V-shaped, X-shaped, I-shaped, ]-shaped, U-shaped, or C-shaped.

The second support member may be substantially perpendicular to the first support member and be lockable thereto by a first locking mechanism that hold the first and second braces in a selected position. The third brace, which is on the second support member, may include a second locking mechanism to hold the third brace in a selected position, for example, in engagement with a piece of the article the support frame is connected to.

In one embodiment, the second support member is removable from the first support member and the first support member includes a supporting bracket extending therefrom that removeably receives one end of the second support member. The first support member may include a sleeve and slidable member, wherein the slidable member is slidable within the sleeve to adjust the length of the first support member.

In another aspect of the invention is a support frame attachable to a cylinder pallet that includes a manifold coupled thereto. The support frame includes an adjustable first support member having a first brace and a second brace and a second support member extending from the first support member. The first support member can be adjusted to move the first and second brace into engagement with the cylinder pallet and the second support member has a slidable third brace that may be slid along its length to move the third brace into engagement with the cylinder pallet. The manifold may be coupled to the second support member at an end opposite from where the second support member extends from the first support member. The support frame may also include one or more of the various features described above for the support frame attachable to an article.

In one embodiment, the support frame includes a vertical post securely, removeably connectable to an adjustable horizontal cross member that has two braces for engaging the pallet. The cross member is engageable with the pallet by spanning a gap between two parallel sides of the pallet, such as two posts or rails. The vertical post extends upwardly beyond the upper ends of any gas cylinders present on the pallet and may incorporate a slidable clamp capable of engaging and clamping to a horizontal side, post, rail, or the like of the pallet. Once adjusted to the pallet, the support frame provides three points of contact with the pallet through the two braces on the horizontal member and the third brace on the vertical post, which may be locked into place to provide a rigid platform for a cantilever arm to be mounted to the vertical post. A gas distribution manifold may be mounted to the cantilever arm.

In one embodiment, the vertical post is fixedly connected to the adjustable horizontal cross member. In another embodiment, the cantilever arm is rotatable about the vertical post of the support frame to facilitate easier removal of empty or leaking cylinders.

Another aspect of the invention is a support frame with manifold kit. The kit may include various components including: (1) an expandable first support member having a first brace, a second brace, and a support bracket for coupling the first support member to another member of the kit; (2) at least one second support member connectable to the support bracket of the first support member, but if it includes a plurality of second support members they may have differing lengths; (3) a third brace positionable on the second support member, the third brace being slidable along the second support member; (4) an arm rotatably mountable on the second support member for rotation about a longitudinal axis defined by the second support member; (5) a manifold connectable to the arm; and optionally (6) one or more hoses connectable to the manifold. In one embodiment, the kit includes up to sixteen pigtail-type hoses.

DETAILED DESCRIPTION

Figure 1:
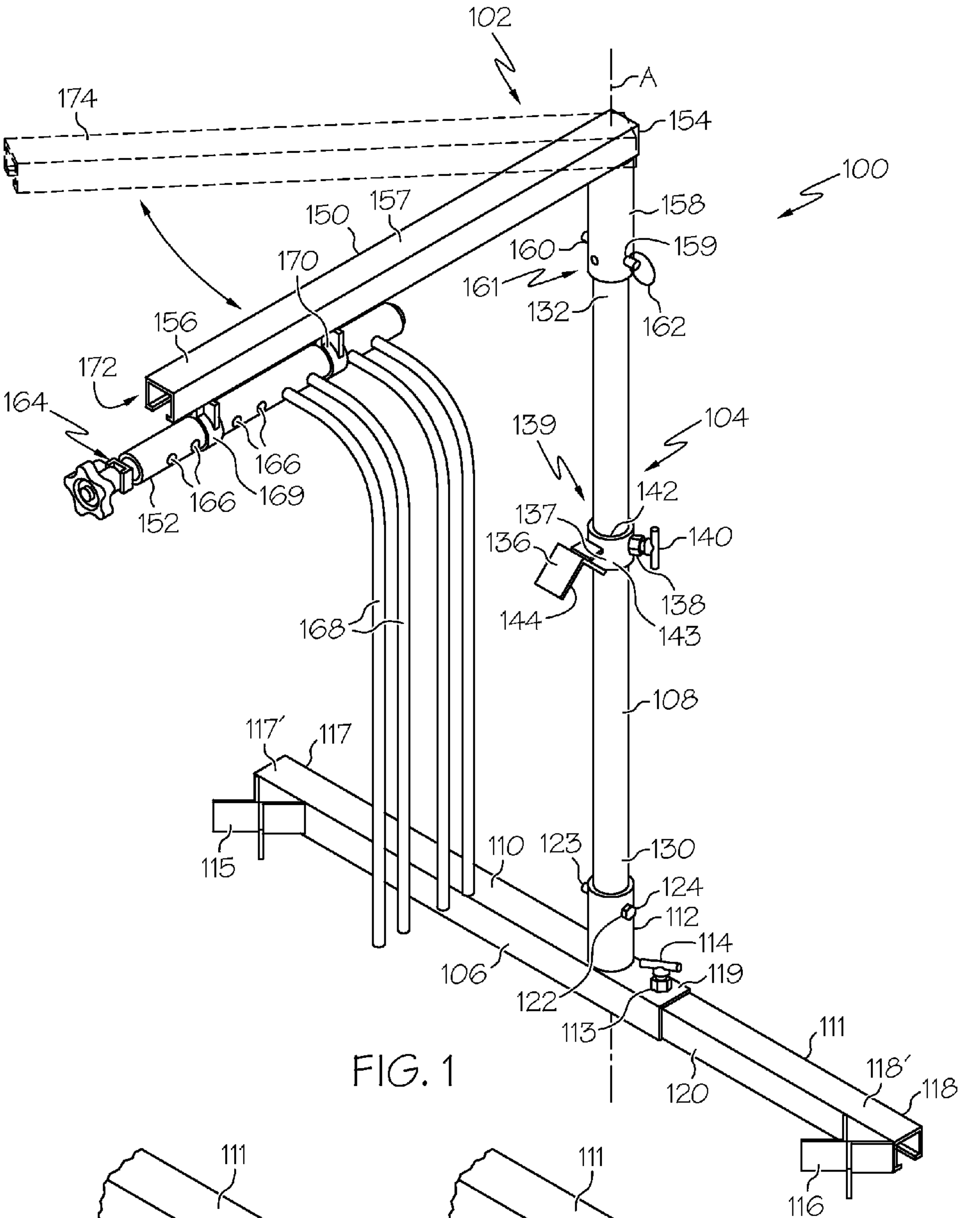
FIG. 1 is a side perspective view of one embodiment of a support frame with manifold.

The following detailed description will illustrate the general principles of the invention, examples of which are additionally illustrated in the accompanying drawings. In the drawings, like reference numbers indicate identical or functionally similar elements.

Referring to FIGS. 1-5, two similar embodiments of a support frame with a manifold, generally designated 100 and 100', respectively, are shown that is demountably connectable to a pallet, a rack, a bundle, a pack, or the like (generally referred to herein as a pallet) that houses gas cylinders. The support frame with manifold 100 includes a support frame 104 that is adjustable such that it provides three points of contact with the pallet to stabilize the frame to support the manifold section 102. The support frame 104 is adjustable in length to the width of the inside or outside dimensions of two adjacent posts of the pallet. The support frame 104 is clampable to the pallet and engages the pallet with a first support member 106 having a first brace 115 and a second brace 116. The support frame 104 includes a second support member 108 coupled to the first support member 106. The second support member 108 includes a third brace 136 (FIG. 1) or third brace 136' (FIG. 5) that is positionable to engage the pallet to provide a third point of contact to stabilize the support frame against the pallet.

Figure 3:
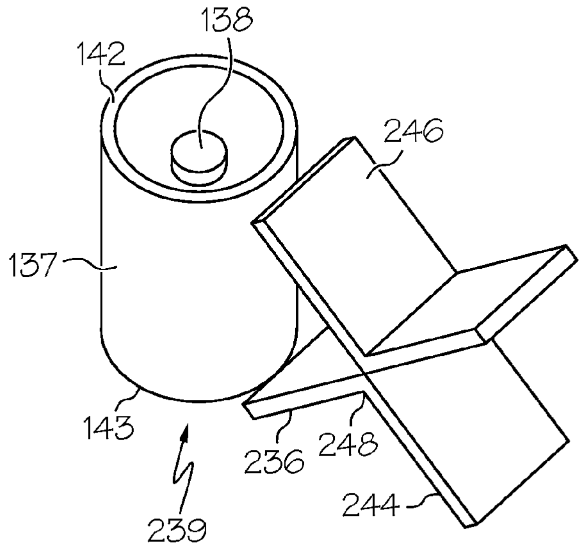
FIG. 3 is a side perspective view of an alternate embodiment of the slidable clamp of FIG. 1.

The third braces 136, 136' are slidably mounted on the second support member 108 and may be positioned inside or outside the frame of the pallet. To place the third braces 136, 136' inside the frame of the pallet, the third brace may need to be removed from the second support member 108, flipped upside down, and put back on the second support member 108. Alternately, as shown in FIG. 3, the third brace 136 may be a double brace that is configured to make either an inside fit or an outside fit connection to the pallet.

In one embodiment, the second support member 108 is oriented generally perpendicular to the first support member 106. Accordingly, if the first support member 106 is oriented horizontally with respect to the pallet such that its length is adjusted horizontally, the third brace 136 is adjustable vertically relative to the pallet. Alternately, if the first support member 106 is oriented vertically with respect to the pallet such that its length is adjusted vertically, the third brace 136 is adjustable horizontally with relative to the pallet.

The manifold section 102 may be removable from and/or rotatable about the support frame 104, more specifically about the second support member 108. The removability and/or rotatability of the manifold section 102 is an advantage over fixed manifold cylinder packs in that the manifold section 102 can be moved out of the way of the cylinders to make replacement and refilling of the cylinders easier. In particular, a single cylinder may be replaced or refilled without requiring the entire pack to be broken down, in particular if the cylinder is positioned on the open end of the pallet. This support frame with manifold will also eliminate the need for cylinder qualification every 5 years.

Looking at the embodiments of FIGS. 1-5 in more detail, the support frame 104 includes a first support member 106 and a second support member 108. The second support member 108 extends from the first support member 106, preferably it extends substantially perpendicular from the first support member 106. The second support member 108 may be fixedly or removeably attached to the first support member 106.

As shown in FIG. 1, the second support member 108 is removeably attached to the first support member 106 by a support bracket 112 extending from the first support member 106. The support bracket 112 may be integral with the first support member 106 or attached thereto, for example, by a weld. The support bracket 112 may include a first hole 122 and a second hole 123 that are aligned with one another on opposite sides of the bracket so that a pin, bolt, screw, or other fastener 124 can be inserted through the first hole 122 and extend through the second hole 123 where the fastener 124 can receive a cotter pin, nut, or other closure member to secure the fastener 124 to the support bracket 112. The second support member 108 includes a bore therethrough, preferably in at least one end thereof such as the first end 130 of the second support member 108 as shown in FIG. 1. The bore may be configured to align with the first and second holes in the support bracket 112 and receives the fastener 124 to removeably couple the second support member 108 to the first support member 106.

Figure 5:
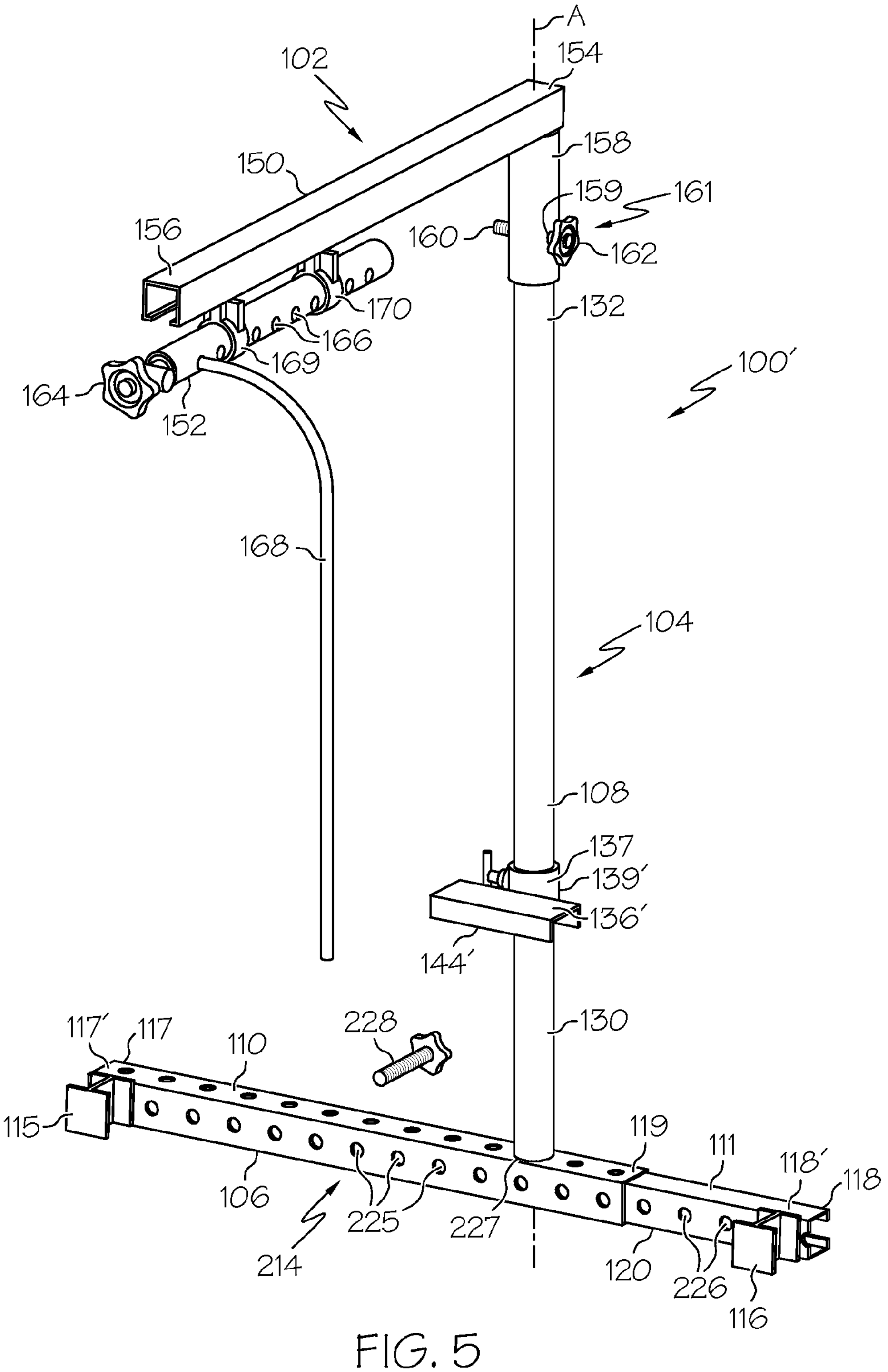
FIG. 5 is a side perspective view of a second embodiment of a support frame with manifold.

As shown in FIG. 5, the second support member 108 is fixedly attached to the first support member 106, for example by a weld 227. Alternately, the second support member 108 may be fixedly attached by adhesive, pin, bolt, screw, or other fastener so that it can be inserted through a first hole and extend through a second hole where the fastener can receive a cotter pin, nut, or other closure member.

The first support member 106 has a first end 117 and a second end 118 and includes a first brace 115 proximal the first end 117 and a second brace 116 proximal the second end 118. The first and second braces 115, 116 may be integral with the first support member 106 or may be attached thereto. In one embodiment, the first and second braces 115, 116 are welded to the first support member 106. In another embodiment, the braces 115, 116 may be attached to the first support member by a fastener, adhesive, or any other fastening mechanism known to one of skill in the art.

The first support member 106 is a two-piece telescoping support that is adjustable. The first support member may include a sleeve 110 and a slidable member 111 received in the sleeve 110. The sleeve 110 has a first end 117' which is the first end 117 of the first support member 106 and a second end 119 that receives a first end 120 of the slide member 111. The slide member 111 also has a second end 118' which is the second end 118 of the first support member 106. The slide member 111 is slidable within the sleeve to adjust the length of the first support member 106, which enables the first support member 106 to be adjustable to the width of the inside or outside dimensions of two adjacent posts or rails of a gas cylinder pallet. Accordingly, the slide member 111 must have dimensions that are slightly smaller than the interior dimensions of the sleeve 110. The sleeve 110 and slidable member 111 may be cylindrical, rectangular, hexagonal, or other shaped tubes, piping, channels, or posts. In another embodiment, the sleeve 110 of the first support member 106 and the second support member 108 may be a monolithic body.

The first support member 106 also includes a first locking mechanism 114 that locks the slidable member 111 to the sleeve 110. The first locking mechanism 114 may be a screw clamp that accesses the slidable member 111 through a hole 113 in the sleeve 110. In the embodiment of FIG. 1, the sleeve 110 includes a single hole 113 which retains the screw clamp. However, as seen in the embodiment of FIG. 5, an alternate first locking mechanism 214 may have the sleeve 110 including a plurality of holes 225 and the slidable member 111 including a plurality of holes 226 that are alignable to receive a removable pin 228 or other type of fastener. The length of the first support member 106 may be adjusted by aligning whichever holes of the sleeve 110 and the slidable member 111 provide the desired length to fit the support frame 104 to the pallet. In another embodiment, the first locking mechanism 114 may be a spring loaded pin similar to the one described in FIGS. 4-4A, described in more detail below, for the rotatable coupling of the arm 150 to the second support member 108, a spring loaded mechanism that fits inside sleeve 110 and is engageable with the slidable member 111, or any other spring loaded or non-spring loaded locking mechanism known to one of skill in the art.

The second support member 108 may be connected to the first support member 106 anywhere along its length, but is preferably connected to the sleeve 110 so that the second support member 108 does not interfere with the slidability of the slidable member 111. In one embodiment, the second support member 108 is connected to the first support member 106 proximal to the second end 119. The second support member 108 may be cylindrical, rectangular, hexagonal, or other shaped rod, tube, or pipe.

The second support member 108 has a first end 130 and second end 132. The first end 130 as discussed above is coupled to the first support member 106 and the second end 132 may be coupled to the manifold section 102. The second end 132 may include one or more bores or holes 133, best seen in FIG. 4A, to receive a third locking mechanism 162. In one embodiment, the second end 132 includes two bores that extend through the support member perpendicular to the longitudinal axis such that the central longitudinal axes C, D of the bores 133 cross at the longitudinal axis A of the second support member 108 and thereby define four 90° angles as shown in FIG. 4A. In another embodiment, the second end 132 may include a plurality of bores equally spaced apart and extending through the second support member 108 all in one plane that is perpendicular to its longitudinal axis A.

The second support member 108 may also include a slidable clamp 139 that includes the third brace 136. As seen in FIGS. 1, 3, and 5, the slidable clamps 139, 239, 139' may include a sleeve 137 defining an open first end 142 and an open second end 143 that is slidable along the length of the second support member 108. The sleeve 137 may include a hole 138 in the side of the sleeve for receiving a second locking mechanism 140 or at least part of a second locking mechanism to lock the slidable clamps 139, 239. 139' onto the second support member 108. The third brace 136 (FIG. 1), 236 (FIG. 3), or 136' (FIG. 5) is attached to the exterior surface of the sleeve 137 and extends outward from the sleeve 137 with at least one open section 144, 244, or 144' of the brace 136, 236, or 136' facing downward toward the first support member 106. In one embodiment, the third brace 136, 236, 136' is fixedly attached to the sleeve 137 for example, by a weld. In another embodiment, the third brace may alternately be bolted, adhered, or clamped thereto.

Figure 2A:
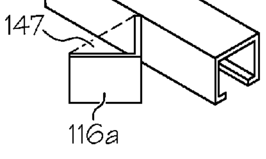
FIGS. 2A-2D are enlarged views of one end of the first support member of FIG. 1 showing alternate embodiments for the second brace.
Figure 2B:
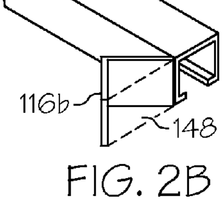
Figure 2C:
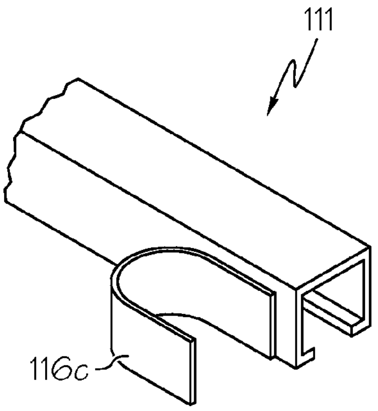
Figure 2D:
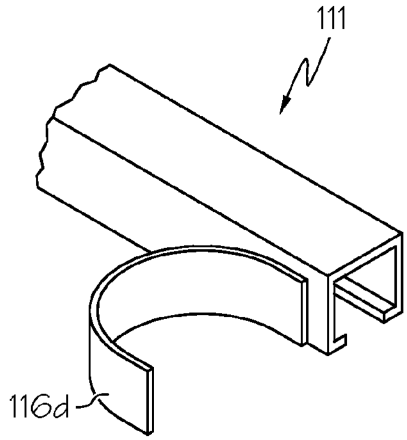

The first and second braces 115, 116 and the third braces 136, 236, 136' may be the same or different and at least on brace is generally V-shaped, X-shaped, I-shaped, ]-shaped, U-shaped, C-shaped, or the like that is open to engage the pallet. As shown in FIG. 1, the first and second braces are X-shaped and the third brace 136 is V-shaped. Alternately, as shown in FIGS. 2A-2B, the first brace 115 and/or the second brace 116, may be generally V-shaped. A V-shaped brace $\mathbf{116}^a$ having the open top of the V 147 facing in the same direction as the end of the first support member 106 opposite the end the V-shaped brace $\mathbf{116}^a$ is most proximal to, as shown in FIG. 2A, can accommodate an outside fit to the pallet. Whereas, a V-shaped brace $\mathbf{116}^b$ having the open top of the V 148 facing in the same direction as the end it is most proximal to, as shown in FIG. 2B, can accommodate an inside fit to the pallet. In another embodiment, the first brace 115 and/or the second brace 116 may be curvilinear and may accommodate an inside fit, an outside fit, or both to the pallet. As shown in FIGS. 2C-2D, two examples of curvilinear braces include a generally U-shaped brace $\mathbf{116}^c$ or a generally C-shaped brace $\mathbf{116}^d$ both of which are shown to enable an inside fit to a pallet, but are not limited thereto. Referring now to FIG. 5, as shown the first and second braces 115, 116 are I-shaped and the third brace 136' is ]-shaped, in particular, the third brace 136' is ]-shaped in a cross-section transverse to the longitudinal axis of the brace.

As shown in FIG. 3, the third brace 236 may alternately be X-shaped. The slidable clamp 239 of FIG. 3 is advantageous in that it does not have to be removed and flipped upside down to accommodate an inside and an outside fit to the pallet. The top V-shape 246 can accommodate an inside fit to the pallet and the bottom V-shape 248 can accommodate an outside fit to the pallet. I-shaped and X-shaped braces are advantageous in that they accommodate both inside and outside fits to the pallet in one device.

Now referring again to FIGS. 1 and 5, the manifold section 102 includes an arm 150 mountable on the second support member 108 and a manifold 152 connected to the arm 150. The manifold 152 is shown in the figures as a generally cylindrical tube, but is not limited thereto. The manifold 152 may be any shape or configuration that is suspendable from the arm 150 and is capable of connecting to one or more of the gas cylinders present on the pallet. Various commercially available manifolds may be suitable for connection to the arm 150.

In one embodiment, the manifold 152 is adjustably connected to the arm 150 by one or more clamps, such as first clamp 169 and second clamp 170. The clamps 169, 170 may allow the manifold 152 to be held in various positions along the length of arm 150. While clamps 169, 170 are shown as the attachment members, it is not limited thereto. One of skill in the art will appreciate that various attachment members may be used to attach the manifold 152 to the arm 150, for example bolts, cables, hooks, latches, pins, screws, or any other suitable adjustable or permanent attachment member. In another embodiment, the manifold 152 may be fixedly attached to the arm.

The manifold 152 includes a plurality of ports 166, preferably along its length, that each connects to a separate hose 168 that may be connectable to a gas cylinder. The manifold 152 may also include one or more valves 164. In one embodiment, the valve 164 is positioned in one end of the manifold 152. In another embodiment, the manifold 152 may include a first valve in one end thereof and a second valve in the opposite end thereof. In another embodiment the ends of the manifold 152 may be sealed or plugged and the valve 164 may be position somewhere along the manifold's length. Positioning the valve 164 along the manifold's length may be more appropriate if the manifold 152 is not a generally cylindrical tube, but is instead a generally rectangular tube.

The arm 150 coupling the manifold 152 to the support frame 104 has a first end 154 and a second end 156. In the embodiments of FIGS. 1 and 5, the first end 154 is cantilevered and the second end 156 is free. The manifold 152 is preferably coupled more proximal to the free end 156 to enable the manifold to be positioned above the gas cylinders for ease of connecting the hoses 168 thereto.

The cantilevered end 154 of the arm 150 is coupled to the second support member 108, for example, by a mount 158. In one embodiment, mount 158 is a sleeve that is slightly larger dimensionally than the second end 132 of the second support member 108 such that the mount 158 fits over the second end 132. In one embodiment, the arm 150 is demountably attached to the second support member 108. The arm 150 may also be repositionable on the second support member 108 such that in a first position 172 the arm 150 extends out over the gas cylinders and in a second position 174 the arm 150 is not over the gas cylinders. In another embodiment, the arm 150 is rotatable about the second end 132 of the second support member 108 and hence may be rotatable about the second support member's longitudinal axis A.

The mount 158 may include one hole 159 or a plurality of holes, for example holes 159, 160, that are part of a third locking mechanism 161 to lock the arm 150 in one or more positions relative to the second support member 108. In the embodiments of FIGS. 1 and 5, the mount 158 includes a first hole 159 and a second hole 160 that are aligned with one another on opposite sides of the mount 159 so that a pin, bolt, screw, or other fastener 162 can be inserted through the first hole 159 and extend through the second hole 160 where the fastener 162 can receive a cotter pin, nut, or other closure member to secure the fastener 162 to the mount 158. The first and second holes 159, 160 should be appropriately positioned such that they are capable of being aligned with one or more of the bores 133 in the second end 132 of the second support member 108 such that the fastener 162 can pass through the first hole 159 of the mount 158 through a bore 133 in the second support member 108 and through the second hole 160 of the mount 158. While the mount 158 has been illustrated to have one or two holes, it is not limited thereto.

Figure 4:
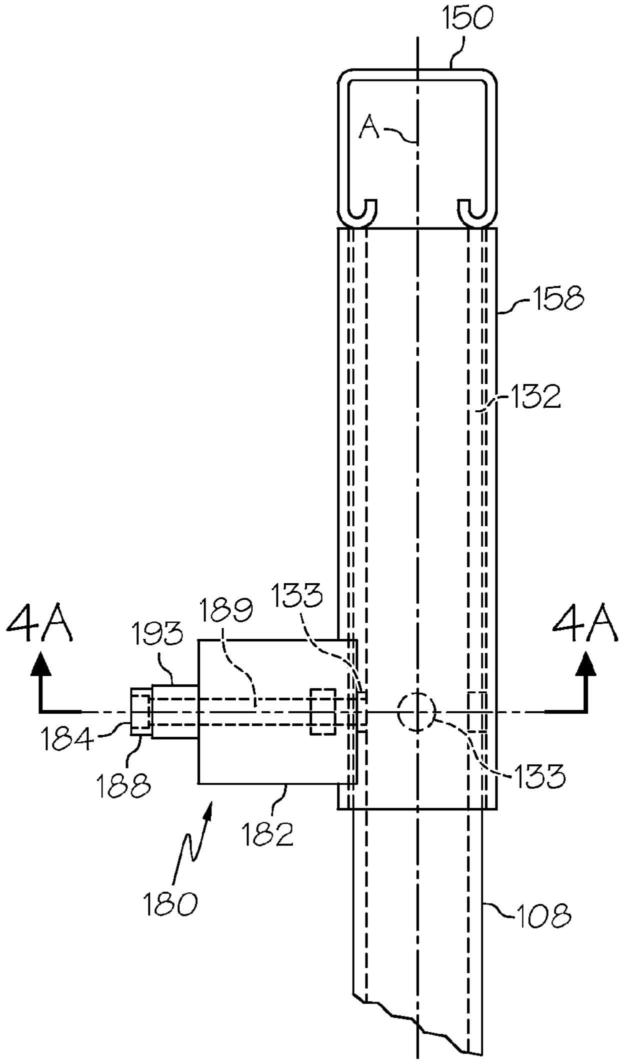
FIG. 4 is a view of one embodiment of a spring-loaded fastener connecting the manifold section to the second support member of FIG. 1.
Figure 4A:
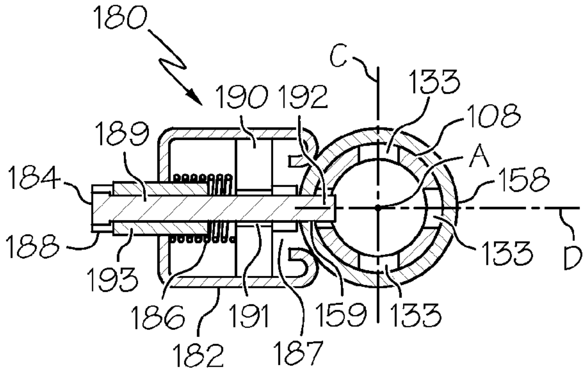

Referring now to FIGS. 4 and 4A, in another embodiment, the third locking mechanism 161 may be a spring-loaded fastener 180. The spring-loaded fastener 180 may include a fastener 184, for example, a pin, bolt, or plunger, having a spring 186 received over at least a section thereof. The fastener 184 may include a head 188 and a shaft 189, wherein the spring 186 is received over the shaft 189. The shaft 189 may have a casing 193 between the shaft 189 and the spring 186. Accordingly, the casing 193 and or the head 188 of the fastener 184 can act as stop for the locking mechanism.

The spring 186 and the shaft 189 of the fastener 184 are housed within a housing 182 that is attached, preferably fixedly attached, to the exterior of the mount 158. The housing 182 is positioned on the mount 158 with the fastener 184, in particular, the shaft 189 of the fastener 184 aligned with hole 159 in the mount 158 such that the shaft 189 can pass through the hole 159 for engagement with the second support member 108, for example, engagement with a bore 133. The spring 186 may be attached to a platform 190 that is movable within the housing to compress the spring 186 in response to extraction of the fastener 184 from the bore 133. The platform 190 includes a hole 191 therethrough, preferably a generally centrally located hole, that the end 192 of the shaft 189 has passed through. With the shaft 189 extending through the hole 191 in the platform 190, a nut 187 may be received on the shaft 189 and positioned against the platform 190 opposite the spring 186. In one embodiment, the platform 190 may be a channel nut.

Figure 6:
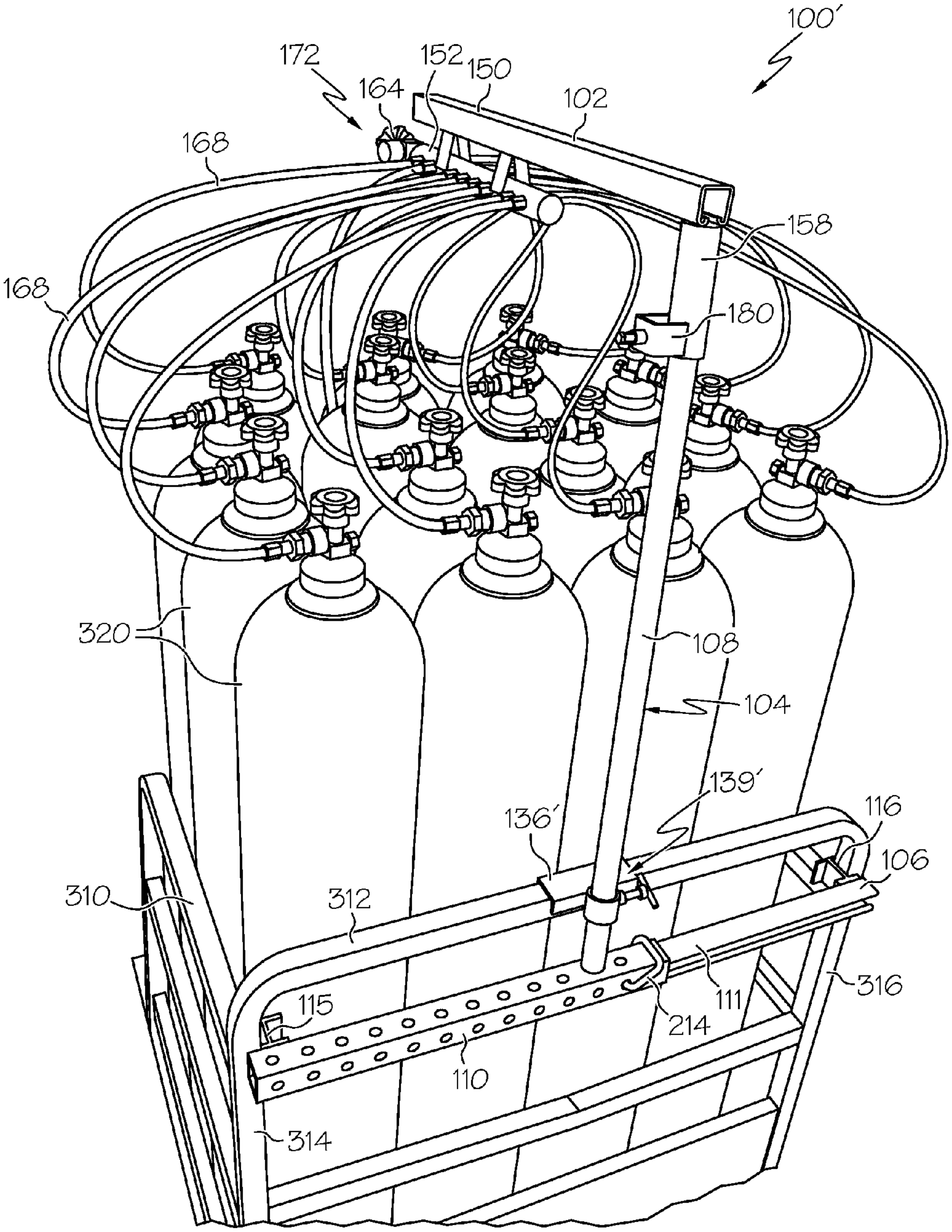
FIG. 6 is a side perspective view of one embodiment with the support frame attached with an inside fit to two vertical posts of the pallet.
Figure 7:
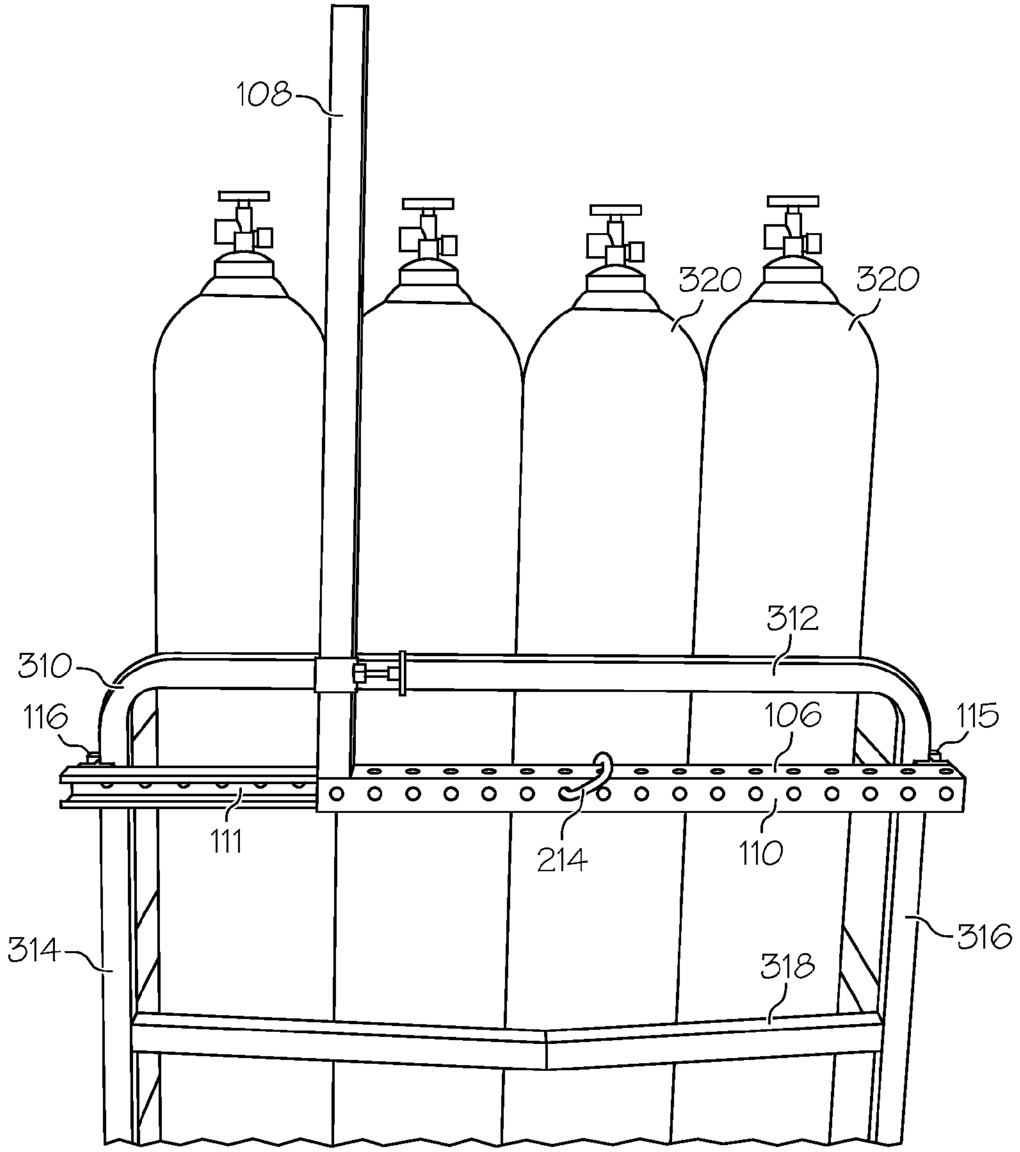
FIG. 7 is a side perspective view of one embodiment with the support frame attached with an outside fit to two vertical posts of the pallet.

Referring now to FIGS. 6 and 7, as discussed above, the support frames with manifold 100, 100' are configured for an inside or an outside fit to a pallet 310 of gas cylinders 320. An inside fit of the first support member 106 is shown in FIG. 6. The first support member 106 was positioned between a first vertical post 314 and a second vertical post 316 of the pallet 310 and then the slidable member 111 was slide out of the sleeve 110 to make the first support member 106 long enough to bring the first brace 115 into engagement with the first vertical post 314 and to bring the second brace 116 into engagement with the second vertical post 316. Once positioned snuggly against the inside of both vertical posts 314, 316, the first locking mechanism 214 was locked to secure the slidable member 111 to the sleeve 110. The third brace 136' of the slidable clamp 139' was originally position above a horizontal rail 312 of the pallet 310 and then lowered along the second support member 108 until the third brace 136' engaged the horizontal rail 312. Once the third brace 136' was engaged with the horizontal rail 312, the slidable clamp 139' was locked or tightened in that position.

Now that the support frame 104 is secured to the pallet 310, the manifold section 102 can be attached to the second support member 108 with the arm in a first position 172 over the cylinders. Next, the hoses 168 of the manifold 152 can be connected to the manifold 152 and to the individual gas cylinders 320. The flow of the gas from the manifold 152 to its point of use may be controlled by valve 164. The second support member 108 should be of an appropriate length to position the manifold section 102, in particular, the manifold 152, above the tops of the gas cylinders 320. In one embodiment, the second support member 108 may include a telescoping configuration that allows the length of the second support member 108 to be adjustable to a necessary height to place the manifold section 102 above the tops of the gas cylinders 320.

An outside fit of the first support member 106 is shown in FIG. 7. The first support member 106 was first lengthened by sliding the slidable member 111 out from within the sleeve 110 to a length longer than the width of the two vertical posts 314, 316 of the pallet 310 where the support member 106 is to be clamped. Then the length of the first support member 106 is reduced by sliding the slidable member 111 back into the sleeve 110 until the first brace 115 engages with the outside of the first vertical post 314 and the second brace 116 engages with the outside of the second vertical post 316. Once positioned snuggly against the outside of both vertical posts 314, 316, the first locking mechanism 214 is locked to secure the slidable member 111 to the sleeve 110. The third brace 136' of the slidable clamp 139' was originally positioned above a horizontal rail 312 of the pallet 310 and then lowered along the second support member 108 until the third brace 136' engaged the horizontal rail 312. Once the third brace 136' was engaged with the horizontal rail 312, the slidable clamp 139' was locked or tightened in that position.

In another embodiment, the first support member 106 may be connected to the pallet 310 with the first brace 115 having an inside fit to the vertical post 114 and the second brace 116 having an outside fit to the vertical post 116, or vice versa. This configuration should be generally as stable as the other configurations described above.

In either embodiment of FIGS. 6 and 7, the slidable clamp 139' having the third brace 136' could be removed and turned upside down on the second support member 108 to facilitate an inside fit of the third brace 136' to the horizontal rail 312. While FIGS. 6-7 illustrate the third brace 136' engaging a top horizontal rail 312 of the pallet 310, it is not limited thereto. The first support member 106 may be positioned lower on the pallet 310 to enable the third brace 136' to engage a secondary or middle horizontal rail, for example secondary horizontal rail 318 in FIG. 7.

Figure 9:
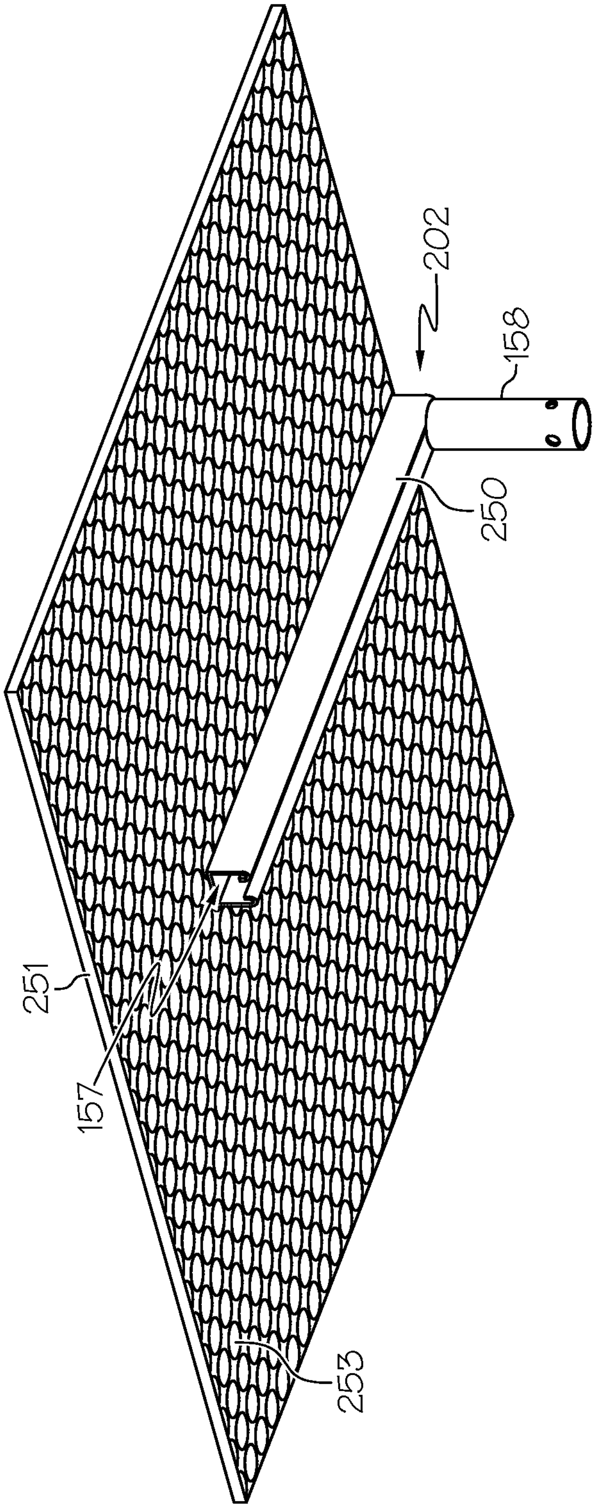
FIG. 9 is a side perspective view of one embodiment of a manifold section of a support frame.

Referring now to FIG. 9, an alternate embodiment for the manifold section 202 of the frame with manifold 100 is disclosed that includes a shield 251 attached to the upper surface 157 of the arm 150. Mount 158 is shown connected to the arm 150. The shield 251 is present to provide a means of protecting the manifold, hoses, cylinder valves, and the cylinders. The shield 251 may be fixedly attached to the arm 150, for example by a weld, an adhesive, or other permanent means. In another embodiment, the shield 251 may be removeably attached to the arm 150, for example, by bolts, screws, or other temporary means. The shield 251 is preferably a plate that is generally planar. The plate may be any shape or dimension, but in one embodiment is generally rectangular or square. The shield may be dimensioned to extend beyond the valves of the cylinders that define the outermost rows and columns of cylinders within a pallet. In one embodiment, the shield 251 may be dimensioned approximately the same as the outer dimensions of the frame of the pallet the support frame with manifold 100 is attached to. The shield 251 may be a solid plate or, as shown in FIG. 9, may include a grid, screen, mesh, or other generally patterned open-pored design 253 as the central body of the plate.

Figure 8:
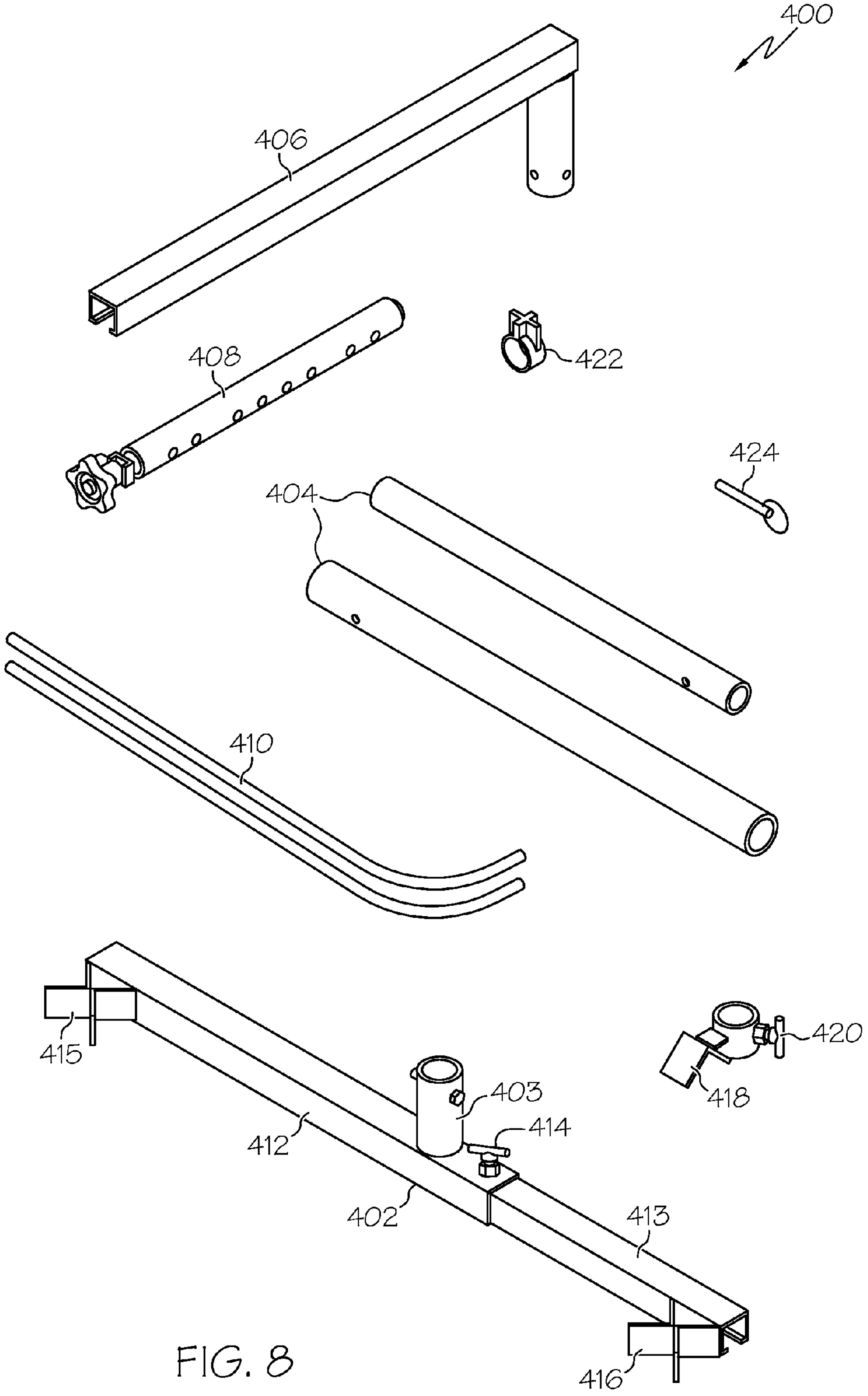
FIG. 8 is an illustration of kit of parts for a support frame with manifold.

Referring now to FIG. 8, disclosed herein is a kit, generally designated 400, containing the components to assembly a support frame with manifold. The kit 400 may include an adjustable-length first support member 402 having a first brace 415, a second brace 416, and a support bracket 403. The support bracket 403 is for coupling the first support member 402 to another member of the kit 400. The kit 400 includes at least one second support member 404 connectable to the support bracket 403 of the first support member 402 and a third brace 418 positionable on the second support member 404 by being slidable along it. The kit may also include an arm 406 demountably and/or rotatably mountable on the second support member 404 for rotation about a longitudinal axis defined by the second support member 404 and a manifold 408 connectable to the arm 406. The kit 400 may also include one or more clamps 422 to connect the manifold 408 to the arm 406 and a pin 424 to lock the arm to the second support member 404.

In one embodiment, the kit 400 includes a plurality of second support members 404 of differing lengths and/or one or more hoses 410 connectable to the manifold 408. The first support member 402 may includes a sleeve 412 and a slidable member 413 that slides within the sleeve. In another embodiment, the first support member 402 also includes a first locking mechanism 414 to lock the slidable member 413 to the sleeve 412.

The third brace 418 within the kit 400 includes a second locking mechanism 420 capable of locking the third brace 418 in engagement with the second support member 404. The first, second, and/or third braces may be V-shaped, X-shaped, I-shaped, or ]-shaped, U-shaped, C-shaped, or the like that is open to engage the pallet. The kit may also include a plurality of third braces 418 of any number of the various shapes or even of various dimensions to increase the universal connectability of the support frame.

It will be appreciated that while the invention has been described in detail and with reference to specific embodiments, numerous modifications and variations are possible without departing from the spirit and scope of the invention as defined by the following claims.

What is claimed is:

1. A support frame attachable to an article comprising:

a first support member having a first brace and a-second brace that each define an opening to abut against the article, the first support member being adjustable, by lengthening or shortening, to move the first brace and the second brace into engagement with the article;

a second support member extending from the first support member, the second support member having a third brace, the third brace being slidable along the second support member to move the third brace into engagement with the article;

an arm mounted on the second support member in a generally horizontal orientation having a first position that places the arm over the article when the first, second, and third braces engage the article; and a fluid-control manifold coupled to the arm, the fluid-control manifold comprising one or more ports and a valve that controls fluid flow through the one or more ports;

wherein a plane corresponding to a central longitudinal axis of the second support member transects the first member and the openings of both the first and second braces face each other toward the plane or face away from one another away from the plane thereby enabling an outside fit or an inside fit of the first support member to the article.

2. The support frame of claim 1 wherein the second support member is removable from the first support member.

3. The support frame of claim 2 wherein the first support member includes a supporting bracket extending therefrom that received an end of the second support member.

4. The support frame of claim 1 wherein the second support member is substantially perpendicular to the first support member.

5. The support frame of claim 1 wherein the first support member includes a first locking mechanism that holds the first and second braces in engagement with the article.

6. The support frame of claim 5 wherein the third brace includes a second locking mechanism that holds the third brace in engagement with the article.

7. The support frame of claim 6 wherein the third brace further includes a sleeve section and a brace section, the brace section being open for engagement with the article.

8. The support frame of claim 1 wherein the third brace defines an opening to receive the article, wherein the opening faces a direction generally perpendicular to the direction of the opening of the first brace.

9. The support frame of claim 1 wherein at least one of the first, second, and third braces is generally V-shaped, X-shaped, I-shaped, ]-shaped, U-shaped, or C-shaped.

10. The support frame of claim 1 wherein the first support member includes a sleeve and a slide, wherein the slide is slidable within the sleeve.

11. The support frame of claim 1 wherein the arm is pivotally mounted to the second support member for rotation about the second support member's longitudinal axis to allow the arm to rotate between at least the first position and a second position.

12. The support frame of claim 11 further comprising a third locking mechanism locking the arm to the second support member.

13. The support frame of claim 11 wherein the arm is a cantilevered arm having a mount coupling the arm to the second support member, the mount having a plurality of holes engageable by the third locking mechanism to lock the arm in one of a plurality of preselected positions.

14. A support frame attachable to a cylinder pallet comprising:

a first support member having a first brace and a second brace, the first support member being adjustable to move the first brace and the second brace closer to one another or further away from one another and thereby into engagement with the cylinder pallet;

a second support member extending generally perpendicularly from the first support member, the second support member having a third brace, the third brace being slidable along the second support member to move the third brace into engagement with the cylinder pallet;

a fluid-control manifold coupled to the second support member opposite its connection to the first support member in a first position where the fluid-control manifold extends generally perpendicularly therefrom and is also generally perpendicular to the orientation of the first support member thereby placing the fluid-control manifold over the portion of the cylinder pallets where cylinders are positioned, wherein the fluid-control manifold comprises one or more ports and a valve that controls fluid flow through the one or more ports.

15. The support frame of claim 14 wherein the second support member is removable from the first support member.

16. The support frame of claim 15 wherein the first support member includes a supporting bracket extending therefrom having received an end of the second support member.

17. The support frame of claim 14 wherein the first support member includes a first locking mechanism that holds the first and second braces in engagement with the cylinder pallet.

18. The support frame of claim 15 wherein the third brace includes a second locking mechanism that holds the third brace in engagement with the cylinder pallet.

19. The support frame of claim 14 wherein at least one of the first, second, and third braces is V-shaped, X shaped, I-shaped, ]-shaped, U-shaped, or C-shaped.

20. The support frame of claim 17 wherein the first support member includes a sleeve and a slide, wherein the slide is slidable within the sleeve.

21. The support frame of claim 14 further comprising an arm coupling the fluid-control manifold to the second support member for rotation of the fluid-control manifold about the second support member's longitudinal axis.

22. The support frame of claim 21 further comprising a third locking mechanism locking the arm to the second support member.

23. The support frame of claim 21 wherein the arm is a cantilevered arm having a mount coupling the arm to the second support member, the mount having a plurality of holes engageable by the third locking mechanism to lock the arm in one of a plurality of preselected positions.

24. The support frame of claim 14 further comprising a hose connected per port of the fluid-control manifold, wherein each hose is connectable to an individual-cylinder in the cylinder pallet.

25. The support frame of claim 1 wherein the arm is demountably coupled to the second support member and the arm is repositionable thereon to move the arm between at least the first position and a second position.

26. The support frame of claim 1 further comprising a hose connected per port of the fluid-control manifold; wherein the arm has a cantilevered attachment to the second support member and the fluid-control manifold is coupled to the arm distally from the cantilevered attachment.

* * * * *